Patented Sept. 22, 1942

2,296,403

UNITED STATES PATENT OFFICE 2,296,403

POLYMERIZATION OF WATER INSOLUBLE ORGANIC COMPOUNDS DISPERSED IN AN AQUEOUS VEHICLE

Archibald Renfrew and William Elliott Frew Gates, Norton-on-Tees, England, assignors to Imperial Chemical Industries Limited, a corporation of Great Britain No Drawing. Application September 20, 1938, Serial No. 230,786. In Great Britain September 29, 1937

6 Claims. (Cl. 260—83)

This invention relates to a polymerization process and, more particularly, to the polymerization of substantially water-insoluble, polyerizable organic compounds dispersed in an aqueous vehicle.

By "dispersion" we mean either true emulsions or the less stable granular suspensions such as are described in British Patent No. 444,257.

Hitherto such dispersions have been prepared with the aid of known organic dispersing agents or colloids. Thus the more stable emulsions have been prepared with the aid of soap-like and other emulsifying agents, whilst the less stable granular suspensions have necessitated the use of protective colloids such as starch.

It is a matter of considerable difficulty to remove these organic dispersing agents or colloids from the product, which thereby suffers from certain disadvantages.

Thus, in the case of the true emulsions, they frequently lack stability, and further chemical changes in the emulsifying agents are apt to develop in the finished articles after a lapse of time. Also in the processes heretofore practised the emulsifying agents or protecting colloids have had no catalytic effect on the polymerization at all and it was necessary to work at economical speeds to employ a polymerization catalyst. Further, in the case of true emulsions the heretofore known emulsifying agents frequently lacked stability which was disadvantageous.

This invention has as an object to devise a method whereby emulsions and dispersions of such polymerized organic substances can be obtained without the use of these objectionable dispersing agents or colloids. A further object is to provide such emulsions and dispersions free of such objectionable dispersing agents or colloids. A still further object is to provide a process of the general type herein considered wherein the substance acting as a dispersing agent will also function as a polymerization catalyst. Further objects will appear hereinafter. These objects are accomplished by the following invention.

We have found that these objects may be attained by subjecting to polymerization conditions an aqueous dispersion of a water insoluble polymerizable organic substance in the presence of a suitable quantity of one or more persulphates.

For preparing dispersions of the "true emulsion" type we have found the persulphates of the alkali metals to be particularly suitable, especially the persulphates of ammonium, lithium, sodium and potassium. These latter substances yield emulsions of exceptional stability.

For the preparation of granular dispersions we have found the persulphates of calcium, magnesium and barium to be preferable.

The quantity of persulphate employed may vary from 0.2%–5% on the weight of the polymerizable organic substance, but in general we have found quantities of the order of about 2% to give the best results.

If desired, any of the usual fillers, plasticizers, colouring materials, or catalysts may be incorporated in the dispersions provided that such substances do not react with or modify the properties of the persulphate so as to impair its dispersing power. In general, however, it is not necessary to add any polymerization catalyst, since the persulphate itself performs this function. For this reason, the amount of persulphate to be added is usually dependent upon the desired rate of polymerization and provided the amount is in excess of 0.5% calculated on the weight of monomer, satisfactory polymerization will be obtained. Since the catalyst effect of the persulphate is not the same for all the polymerizable substances to which the invention may be applied, it is necessary to make preliminary tests to ascertain the best quantity of persulphate to employ.

Dispersions are prepared according to our invention by stirring a suitable mixture of water, persulphate and monomer with or without additional substances of the kind referred to in the preceding paragraph, whilst subjecting the whole to polymerizing conditions, e. g. heat, ultra-violet irradiation or other known means. We prefer to bring about polymerization by means of heat in which case the mixture should be maintained gently refluxing, which will usually bring about substantially complete polymerization in about half an hour. For preparing true emulsions, stirring should be very vigorous.

In order that the nature of our invention may be clearly understood, we give the following examples by way of illustration, but it is understood that the scope of the invention is in no way limited thereby. The parts are by weight in all cases.

Example 1

| | Parts |
|---|---|
| Methyl methacrylate | 30 |
| Water | 100 |
| Ammonium persulphate | 0.3 |

The above mixture was vigorously stirred at about 80° C. at which temperature gentle refluxing took place. After about half an hour, exothermic polymerization set in and the temperature rose to 90–95° C. without the application of heat. When polymerization was complete, the temperature began to fall, stirring was discontinued and the whole allowed to cool. The resulting dispersion of polymer in water was exceedingly stable.

Example 2

| | Parts |
|---|---|
| Methyl methacrylate | 30 |
| Dibutyl phthalate | 20 |
| Water | 100 |
| Lithium persulphate | 1 |

This mixture was treated in exactly the same way as in Example 1. An exceedingly stable emulsion of polymerized methyl methacrylate in the aqueous vehicle was obtained.

Example 3

| | Parts |
|---|---|
| Methyl methacrylate | 33 |
| Water | 66 |
| Barium persulphate | 0.2 |

This mixture was treated in exactly the same way as in Example 1.

The polymer was obtained in the form of spherical granules.

Example 4

| | Parts |
|---|---|
| Methyl methacrylate | 30 |
| 2-ethyl hexyl methacrylate | 70 |
| Water | 200 |
| Ammonium persulphate | 0.5 |

The ingredients were stirred in an enamel-lined vessel fitted with a reflux condenser, and heated to 95° C. for 45 minutes, and then cooled to room temperature. A stable aqueous dispersion of the resin was obtained.

Example 5

| | Parts |
|---|---|
| Amyl methacrylate | 60 |
| Dibutyl phthalate | 40 |
| Water | 200 |
| Ammonium persulphate | 0.5 |

The mixture was heated under reflux for 30 minutes whilst stirring vigorously. On cooling a stable emulsion was obtained.

It will be understood that the above examples are merely illustrative and that the invention broadly comprises dispersing a substantially water-insoluble, polymerizable, organic compound in an aqueous vehicle in the presence of a persulphate and subjecting the resulting dispersion to polymerizing conditions.

In general, the process is applicable to the whole class of substantially water-insoluble, polymerizable organic compounds having the group:

those polymerizable compounds that are water-soluble to a degree are, obviously, not adapted to be dispersed in an aqueous vehicle. Among the compounds particularly suited for use in the present invention are styrene, alpha methyl styrene, and the nitriles and esters of acrylic, methacrylic, and homologous acids. Among such esters may be mentioned:

| | |
|---|---|
| Methyl methacrylate | Para cyclohexyl phenyl methacrylate |
| Ethyl methacrylate | Decahydro-beta-naphthol methacrylate |
| Butyl methacrylate | |
| Isobutyl methacrylate | |
| Secondary butyl methacrylate | Di-isopropyl carbinol methacrylate |
| Tertiary amyl methacrylate | Furfuryl methacrylate |
| | Tetrahydro furfuryl methacrylate |
| Phenyl methacrylate | Methyl acrylate |
| Glycol monomethacrylate | Ethyl acrylate |
| Glycol dimethacrylate | Butyl acrylate |
| Cyclohexyl methacrylate | |

The invention is likewise applicable to the formation of interpolymers by employing a mixture of two or more monomeric substances.

Instead of the ammonium persulphate of Example 1 we could have used the persulphates of lithium, sodium, potassium, rubidium or caesium. Instead of the barium persulphate of Example 3 we could have used the persulphates of calcium, magnesium, copper, zinc or thallium. A mixture of persulphates may be used and other dispersing agents may be used in conjunction with the persulphate but this latter expedient is not particularly desirable and, in the preferred embodiment of the invention, no other dispersing agents are added.

The polymerization catalysts heretofore used in the known batch processes of polymerization are adapted for use in the process of the present invention. Such catalysts include benzoyl peroxide, acetyl peroxide, acetyl benzoyl peroxide, and mixtures of benzyl peroxide and hydrogen peroxide.

Instead of using a straight monomer, a syrup of partially polymerized material may be employed. This syrup, in order to avoid difficulties in emulsification, should not exceed the viscosity of glycerin and, in the case of methyl methacrylate, would contain not more than about 1 or 2% polymer. The syrup may be prepared either by subjecting the monomer to heat until the desired degree of polymerization has developed or by dissolving previously prepared polymer in monomer. The use of such a syrup effects a saving in time in the polymerization process. Also, it is useful in making pigmented emulsions because the necessary dispersion of the pigment may be effected by grinding same with a dough of polymer in a suitable solvent.

This invention is a valuable advance in the art as such aqueous emulsions provide cheap and convenient methods by which these polymers can be applied to such things as textiles and by which moulding powders can be manufactured; by this invention the emulsions can now be manufactured free of the dispersing agents and protective colloids which have in the past detracted from their value. And a further advantage of the present invention is that it provides a method of preparing unusually stable dispersions of the "true emulsion" type. Another advantage lies in the fact that the persulphates besides being excellent dispersing agents also are polymerization catalysts and permit either the reduction or elimination of special polymerization catalysts.

As many apparently widely different embodiments of this invention may be made without departing from the spirit and scope thereof, it is to be understood that the invention is not limited to the specific embodiments thereof, except as defined in the appended claims.

We claim:

1. Process of polymerizing a substantially water insoluble, polymerizable, organic compound having the group

to obtain a dispersion of said compound in the polymerized state in an aqueous vehicle, which comprises dispersing said organic compound in the liquid state in an aqueous vehicle in the presence of a persulphate from the group consisting of the alkali metal and alkaline earth metal persulphates, as a dispersing agent, the amount of said organic compound dispersed in said vehicle being in substantial excess of the amount soluble in said vehicle under the prevailing conditions, and thereafter subjecting said dispersion to agitation and polymerizing conditions, said process being carried out in the absence of other substances capable of effecting dispersion of said compound.

2. Process of polymerizing methyl methacrylate to obtain a dispersion of methyl methacrylate polymer in an aqueous vehicle, which comprises dispersing the methyl methacrylate in the liquid state in an aqueous vehicle in the presence of a persulphate from the group consisting of the alkali metal and alkaline earth metal persulphates, as a dispersing agent, the amount of said methyl methacrylate dispersed in said vehicle being in substantial excess of the amount soluble in said vehicle under the prevailing conditions, and thereafter subjecting said dispersion to agitation and polymerizing conditions, said process being carried out in the absence of other substances capable of effecting dispersion of the methyl methacrylate.

3. Process of polymerizing a substantially water insoluble, polymerizable organic compound having the group

to obtain a suspension of spherical granules of said compound in the polymerized state in an aqueous vehicle, which comprises dispersing said organic compound in the liquid state in an aqueous vehicle in the presence of an alkaline earth metal persulphate as a dispersing agent, the amount of said organic compound dispersed in said vehicle being in substantial excess of the amount soluble in said vehicle under the prevailing conditions, and thereafter subjecting said dispersion to agitation and polymerizing conditions, said process being carried out in the absence of other substances capable of effecting dispersion of said compound.

4. Process of polymerizing a substantially water insoluble, polymerizable, organic compound having the group

to obtain a stable emulsion of said compound in the polymerized state in an aqueous vehicle, which comprises dispersing said organic compound in the liquid state in an aqueous vehicle in the presence of an alkali metal persulphate as a dispersing agent, the amount of said organic compound dispersed in said vehicle being in substantial excess of the amount soluble in said vehicle under the prevailing conditions, and thereafter subjecting said dispersion to agitation and polymerizing conditions, said process being carried out in the absence of other substances capable of effecting dispersion of said compound.

5. Process of polymerizing methyl methacrylate to obtain a suspension of spherical granules of methyl methacrylate polymer in an aqueous vehicle, which comprises dispersing the methyl methacrylate in the liquid state in an aqueous vehicle in the presence of an alkaline earth metal persulphate as a dispersing agent, the amount of said methyl methacrylate dispersed in said vehicle being in substantial excess of the amount soluble in said vehicle under the prevailing conditions, and thereafter subjecting said dispersion to agitation and polymerizing conditions, said process being carried out in the absence of other substances capable of effecting dispersion of the methyl methacrylate.

6. Process of polymerizing methyl methacrylate to obtain a stable emulsion of methyl methacrylate polymer in an aqueous vehicle, which comprises dispersing the methyl methacrylate in the liquid state in an aqueous vehicle in the presence of an alkali metal persulphate as a dispersing agent, the amount of said methyl methacrylate dispersed in said vehicle being in substantial excess of the amount soluble in said vehicle under the prevailing conditions, and subjecting said dispersion to agitation and polymerizing conditions, said process being carried out in the absence of otoher substances capable of effecting dispersion of the methyl methacrylate.

ARCHIBALD RENFREW.
WILLIAM ELLIOTT FREW GATES.